United States Patent [19]
van Gestel

[11] Patent Number: 5,627,594
[45] Date of Patent: May 6, 1997

[54] METHOD OF TRANSMITTING TELETEXT PAGES

[75] Inventor: Henricus A. W. van Gestel, Eindhoven, Netherlands

[73] Assignee: U.S. Philips Corporation, New York, N.Y.

[21] Appl. No.: 498,249

[22] Filed: Jun. 29, 1995

[30] Foreign Application Priority Data

Jul. 8, 1994 [EP] European Pat. Off. ............... 94201990

[51] Int. Cl.⁶ ............................................. H04N 7/087
[52] U.S. Cl. ............................................ 348/468; 348/461
[58] Field of Search ........................... 348/468, 467, 348/461, 478; 345/112, 127, 128, 129, 130, 143, 150; H04N 7/087, 7/08

[56] References Cited

U.S. PATENT DOCUMENTS 4,698,677  10/1987  Kinghorn et al. ...................... 348/468
4,910,595   3/1990  Bugg et al. ............................. 348/468
5,221,968   6/1993  Bugg ....................................... 348/468
5,294,982   3/1994  Salomon et al. ....................... 348/461
5,355,170  10/1994  Eitz et al. ............................... 348/467

OTHER PUBLICATIONS

J.P. Chambers, "Potential of extended teletext", Journal of the Royal Television Society, Sep./Oct. 1980, pp. 43–45.
"Teletext Specification", Interim Tehnical Document SPB 492 of the European Broadcasting Union, Dec. 1992.

*Primary Examiner*—John K. Peng
*Assistant Examiner*—Nathan J. Flynn
*Attorney, Agent, or Firm*—Arthur G. Schaier

[57] ABSTRACT

Method, transmitter and receiver for transmitting, receiving and displaying teletext pages. A Level 1 teletext page transmitted in a known manner is extended to a higher display level using extension signals. To activate a desired attribute in an area covering a plurality of rows, the extension signals include a height code which indicates the number of further rows in which the further attributes must be repeated.

8 Claims, 5 Drawing Sheets

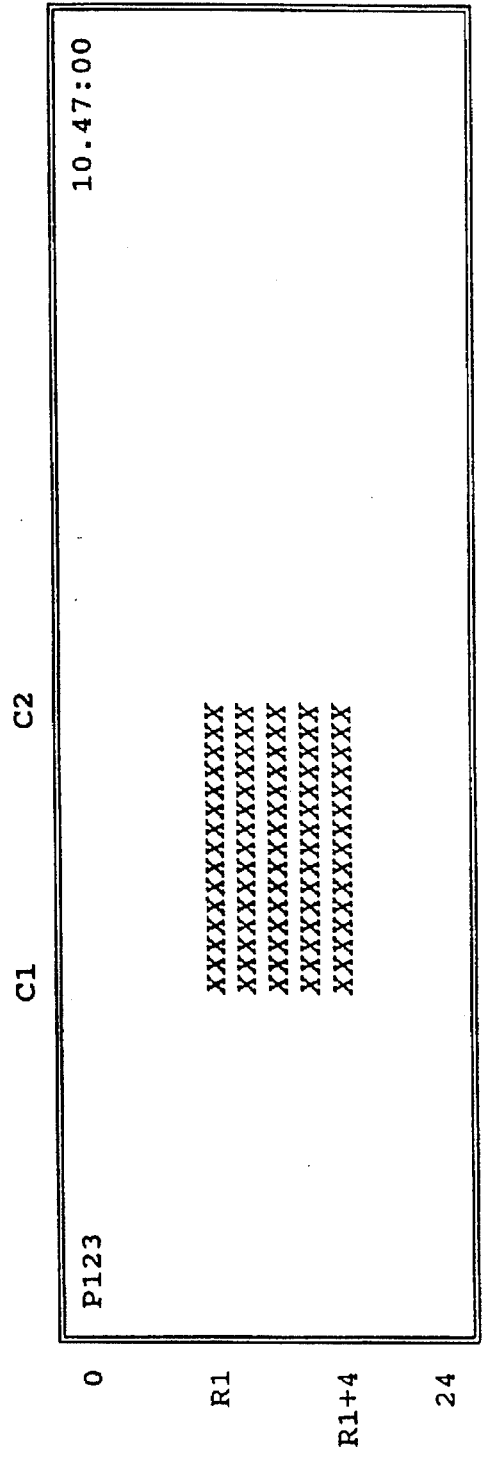
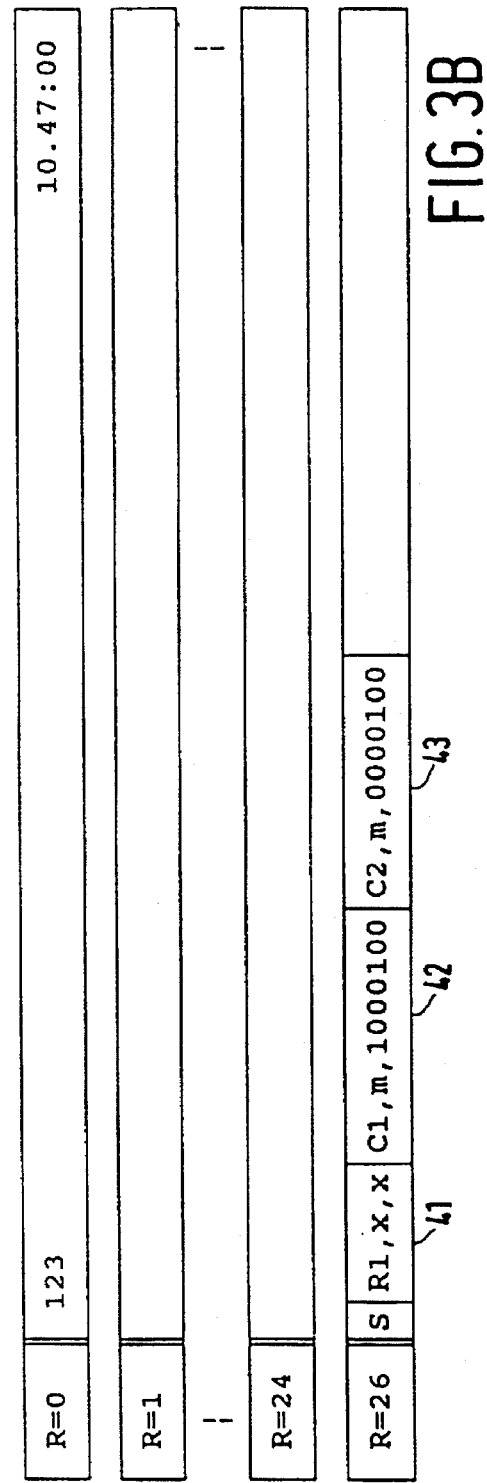
FIG.3A
FIG.3B

R1           XXXXXXXXXXXX
R2           XXXXXXXXXXXXYYYYYY
R1+4         XXXXXXXXXXXXYYYYYYYYYYYY
R2+3         XXXXXXXXXXXXYYYYYYYYYYYYYYYYYY
24                       YYYYYYYYYYYYYYYYYYYYYY
```

FIG.4B

| R=0 | R=1 | -- | R=24 | R=26 |
|---|---|---|---|---|
| 10.47:00 | 123 | | | S \| R1,x,x \| C1,m,1000100 \| C2,m,0000011 \| R2,x,x \| C3,m,0100011 |
| | | | | 61 \| 62 \| 63 \| 64 \| 65 |

METHOD OF TRANSMITTING TELETEXT PAGES

FIELD OF THE INVENTION

The invention relates to a method of transmitting teletext pages. The invention also relates to a transmitter and a receiver for transmitting and receiving teletext pages, respectively.

BACKGROUND OF THE INVENTION

A known method of transmitting teletext pages is described in "Teletext Specification", Interim Technical Document SPB 492 of the European Broadcasting Union, December 1992. In this known method, a teletext page with first display attributes is transmitted. "Attributes" are understood to mean display properties such as, for example, the colour of characters, blinking, double height and the like. The Level 1 teletext standard, which is currently used worldwide, has a limited number of attributes. Moreover, these attributes have a serial character, which means that they can only be modified in the spaces between words. The "Teletext Specification" therefore provides the transmission of extension signals for transmitting further attributes for display from a predetermined row and column position. The further attributes are added to the Level 1 teletext page and thus "upgrade" this page to a higher display level which is often referred to as Level 2 and Level 3.

An attribute transmitted by the extension signals applies to all subsequent character positions in the same row until it is either modified or reaches the end of the relevant row. The extension signal should therefore be repeated for each row if an attribute is applicable to a plurality of rows.

OBJECT AND SUMMARY OF THE INVENTION

It is an object of the invention to provide an efficient transmission of the further attributes and an efficient processing of these attributes in a teletext receiver.

To this end, the method according to the invention has extension signals including a height code indicating the number of further rows in which the further attributes are repeated from the predetermined column position. As a result an extension signal need not be repeated for each row if the relevant attribute extends across a plurality of rows of the page.

In principle, an attribute thus transmitted is active until the end of the relevant rows. To be able to deactivate an attribute at an earlier instant, an embodiment of the method has the row and column positions and the height code determine the starting limit of an area and the further attributes extend as far as the starting limit of an area having a higher column position. Defining such an area with a higher column position takes an extra extension signal and thus appears to be inefficient. However, it has the advantage that a receiver receives the original attributes again and thus need not memorize these attributes itself. Moreover, non-rectangular areas can now be defined by defining a different height in the extra extension signal.

A teletext receiver for receiving and displaying teletext pages comprises a decoder for decoding a teletext page with predetermined first display attributes and for decoding extension signals with further attributes for display from a predetermined row and column position, and a display for displaying the page with said first and further attributes. The decoder are adapted to decode a height code accommodated in the extension signal and to repeat the further attributes from the predetermined column position in a number of further rows corresponding to the height code.

BRIEF DESCRIPTION OF THE FIGURES

FIGS. 3A and 4A show examples of teletext pages in a desired display format.

FIGS. 3B and 4B show sequences of data packets for obtaining the display formats shown in FIGS. 3A and 4A, respectively.

DETAILED DESCRIPTION OF THE PREFERRED EMBODIMENTS

Figure 1:
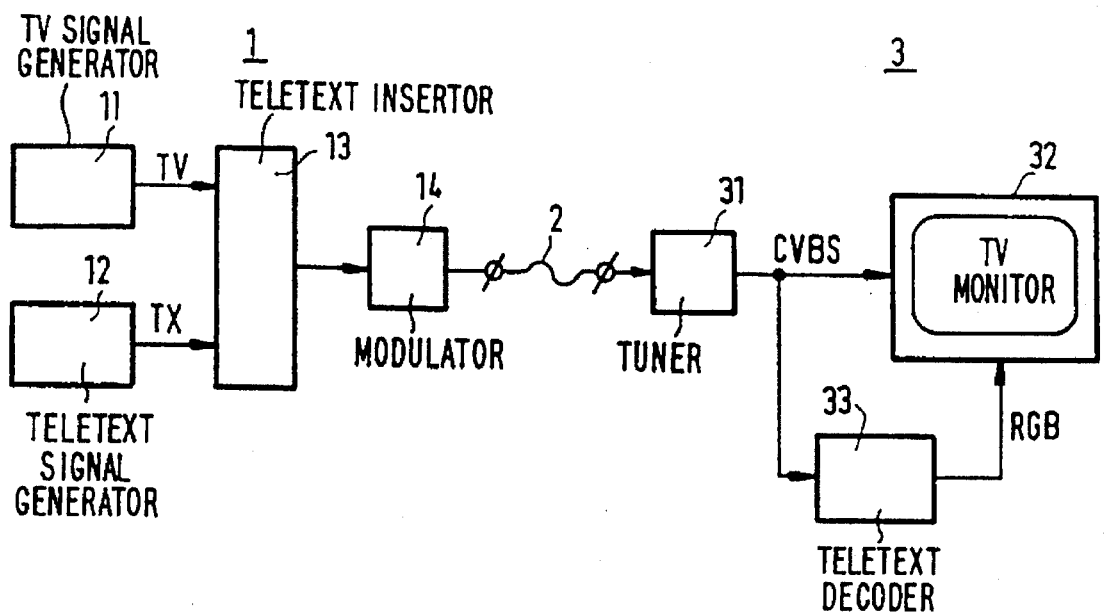
FIG. 1 shows diagrammatically a teletext transmission system to explain the method according to the invention.

FIG. 1 shows diagrammatically a teletext transmission system to explain a method according to the invention. The system includes a transmitter station 1, a transmission medium 2 and a receiver 3. The transmitter station includes a television signal generator 11, a teletext signal generator 12, a teletext inserter 13 and a modulator 14. The television generator 11 generates a picture signal TV while the teletext generator 12 generates a teletext signal TX. Both signals are combined in teletext inserter 13 as a video signal which is applied to the modulator 14 and is transmitted via transmission medium 2. The receiver 3 includes a tuner 31 for demodulating the video signal. The demodulated video signal CVBS is applied to a television monitor 32 for further processing and display. The video signal is also applied to a teletext decoder 33. This decoder decodes the teletext signal accommodated therein and applies a teletext picture signal RGB to the television monitor 32.

Figure 2:
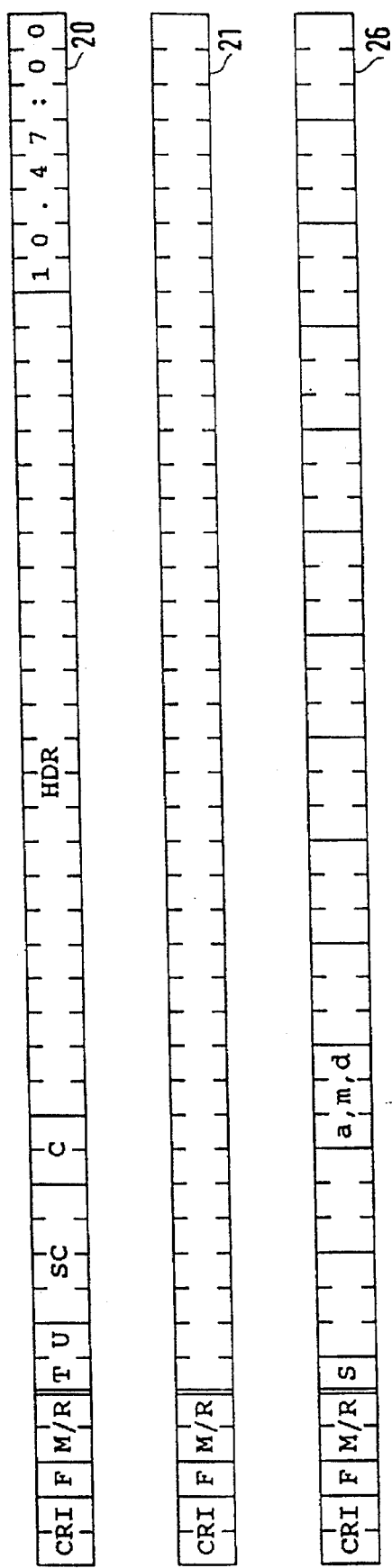
FIG. 2 shows some examples of data packets which are transmitted by a transmitter station shown in FIG. 1.

For each transmitted teletext page, the teletext signal includes a plurality of data packets which are accommodated in further known manner in picture lines of the video signal during the flyback period. FIG. 2 shows some possible forms of these data packets in greater detail. As has been attempted to show in this Figure, each data packet includes 45 bytes of 8 bits each. The first 2 bytes having a fixed value 1010 . . . 10 are referred to as "clock run-in" and are denoted by CRI in the Figure. The third byte is referred to as a "framing code" F and has also a fixed value. The next two bytes include a 3-bit magazine number M and a 5-bit row number R. The meaning of the other 40 bytes depends on the value of the row number R.

If the row number R has the value 0, as is assumed for data packet 20 in FIG. 2, the data packet is a page header of a teletext page. The series of 40 bytes of such a page header starts with two digits T (tens) and U (units) of the page number, a subcode SC and a plurality of control bits C. The remaining part includes 24 character positions with a page header text HDR and 8 character positions for displaying the actual time. If the row number R has one of the values 1–25, as is assumed for data packet 21 in FIG. 2, the 40 bytes constitute a text row of 40 characters for display on a display screen in accordance with the previously mentioned Level 1 display format. If the row number R has one of the values 26–31, as is assumed for data packet 26 in FIG. 2, the data packet is an extension packet for upgrading the display to Level 2 or 3. It includes a sequence number S by use of which a plurality of extension packets with the same row number R can be distinguished. Extension packets are ignored by Level 1 decoders. The extension packets with row number R=26 are interesting in the following description.

The transmission of a teletext page starts with, and implies the page header of this page and subsequently includes the relevant text rows and extension packets. The page number is represented by the magazine number M, tens T and units U. It is a 3-digit number and is generally in the range between 100 and 899 in order that the user can select the pages by means of a decimal keyboard. Generally, a series of teletext pages is transmitted in a repetitive cycle.

As has been attempted to show in FIG. 2, 39 bytes of extension packet 26 are divided into thirteen triplets of three bytes each. Such a triplet, or a series of triplets, represents an extension signal and defines a given "upgrading" of the Level 1 page to Level 2 and/or Level 3. By use of the indication {a,m,d} in FIG. 2, it has been attempted to show that each triplet in data packet 26 comprises a 6-bit address field a, a 5-bit mode field m and a 7-bit data field d. The remaining bits of the triplets are parity bits for error detection. If the address field a has a value in the range 40–63, the triplet addresses a row in the range 1–24. Such a triplet will hereinafter be referred to as "row triplet". If the address field a has a value in the range 0–39, the triplet addresses the corresponding column within a given row. Such a triplet will hereinafter be referred to as "column triplet". Level 2 or 3 attributes are transmitted by addressing a character position by means of one or more triplets, by indicating a processing mode and by defining the desired attribute in the data field.

For use of the method according to the invention, one or more processing modes m are assigned to triplets which relate to a rectangular area extending as far as the right border of the teletext page. It will be assumed in the following embodiment that the data field d of such a triplet defines the attribute as well as the number of times the attribute should be duplicated in subjacent rows (i.e. the height of the area minus 1). The following survey shows a possible meaning of the seven bits d1 ... d7 of the data field of such a triplet:

| d1 | Italic | (0 = off, 1 = on) |
|----|--------|-------------------|
| d2 | Bold | (0 = off, 1 = on) |
| d3 | Underline | (0 = off, 1 = on) |
| d4 | Proportional spacing | (0 = off, 1 = on) |
| d5 | Height code | (0-7) |
| d6 | | |
| d7 | | |

The attributes "underline", "bold", "italic" and "proportional spacing" mentioned in the Table have hitherto not been incorporated in the known "Teletext Specification". Consequently, the invention is applicable to these novel attributes without any further compatibility problems. However, already existing attributes such as colour settings may be transmitted in a corresponding manner, if desired.

The invention will now be further described with reference to an example. To this end, FIG. 3A shows a teletext page in a desired display format. A rectangle in which the characters of the Level 1 page must be displayed in italics is denoted by XXX in this Figure.

FIG. 3B shows the sequence of data packets transmitted for this page. The sequence includes a page header R=0, text rows R=1 to R=24 and an extension packet R=26. The extension packet includes two extension signals. The first extension signal includes a row triplet 41 and a column triplet 42. Row triplet 41 has the contents {R1,x,x}, which means that the address field a (having a value in the 40–63 range) addresses row R1 of the page. The mode field m and data field d of the row triplet have a don't care value x. Column triplet 42 has the contents {C1,m,1000100}, which means:

the address field a (having a value in the 0–39 range) addresses column C1 within the current row (here R1);

the processing mode m for processing a rectangular area is assigned;

the data field d has the value 1000100, which in accordance with the foregoing means that display in italics is activated (d1 ... d4=1000) and that the area also extends across the next 4 rows (d5 ... d7=100).

Thus, the triplets 41 and 42 activate display in italics in an area which is defined by character position (R1,C1), has a height of 5 rows and potentially extends as far as the right border of the page.

The second extension signal is constituted by a column triplet 43 having the contents {C2,m,0000100}. This triplet deactivates the display in italics in an area which is defined by the column position C2 of the current row R1, has a height of 5 rows as well and extends as far as the right border of the page. Since the column triplet relates to the row R1 which has already been addressed, it need not be preceded by a row triplet.

FIG. 4A shows a second embodiment of a teletext page in a desired display format. By means of XXX, this Figure again shows the rectangle within which the characters of the Level 1 page should be displayed in italics. Moreover, YYY denotes a non-rectangular area in which the characters must be displayed in bold type (not in italics). The extension packet R=26 shown in FIG. 4B for this page now comprises the following series of triplets:

row triplet 61 with contents {R1,x,x} for addressing row R1;

column triplet 62 with contents {C1,m,1000100} for italicizing the text in a rectangular area with vertex (R1, C1) and a height of 5 rows;

column triplet 63 with contents {C2,m,0000011} for deactivating the display in italics in a rectangular area with vertex (R1, C2) and a height of 4 rows;

row triplet 64 with contents {R2,x,x} for addressing row R2;

column triplet 65 with contents {C3,m,0100011} for displaying the text in bold type in an area with vertex (R2, C3) and a height of 4 rows.

Note that the last area is not rectangular because it is partly bounded by the area defined in triplet 63 which is still active and is situated further to the right, and partly by the end of the row.

Figure 5:
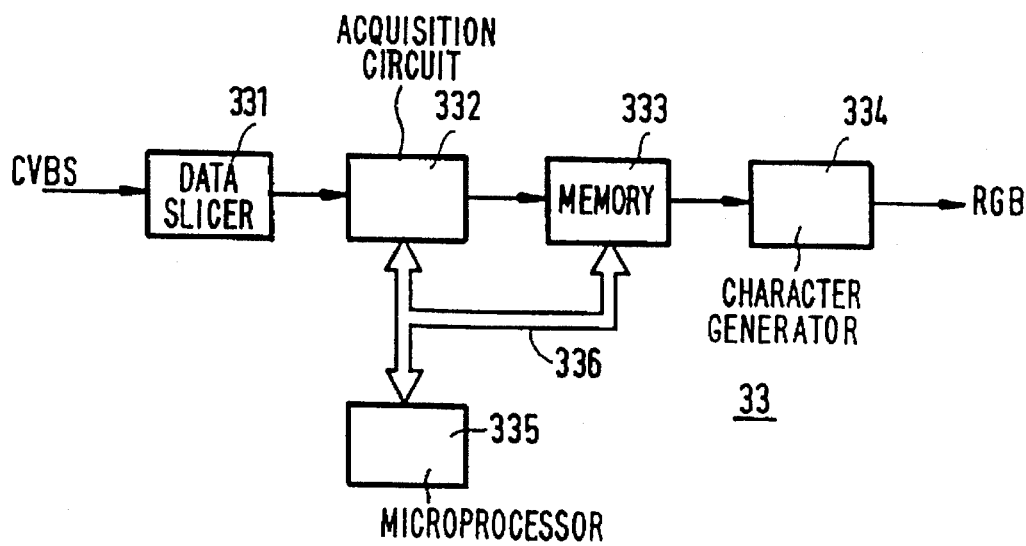
FIG. 5 shows greater detail a teletext receiver shown in FIG. 1.

FIG. 5 shows in greater detail the teletext decoder denoted by 33 in FIG. 1. Such a teletext decoder is constituted, for example by the integrated circuit SAA5270 of Philips. The decoder includes a data slicer 331 for regaining the data packets from the video signal CVBS, an acquisition circuit 332 for receiving the data packets of a desired page, a memory 333 for storing the received data packets and the page to be displayed, and a character generator 334. The decoder further includes a microprocessor 335, which can read and write to the memory 333 via a communication bus 336. Particularly, the microprocessor can read and process the received data packets and rewrite the result of the operation in the memory for display by the character generator. To this end, memory 333 includes a location CHR (r,c) for each character position (r,c) of the page for storing a character code, as well as a location ATT(r,c) for storing the attributes to be displayed at that position. The character generator 334 reads the locations at a given picture frequency and converts the information into displayable RGB picture signals.

Figure 6:
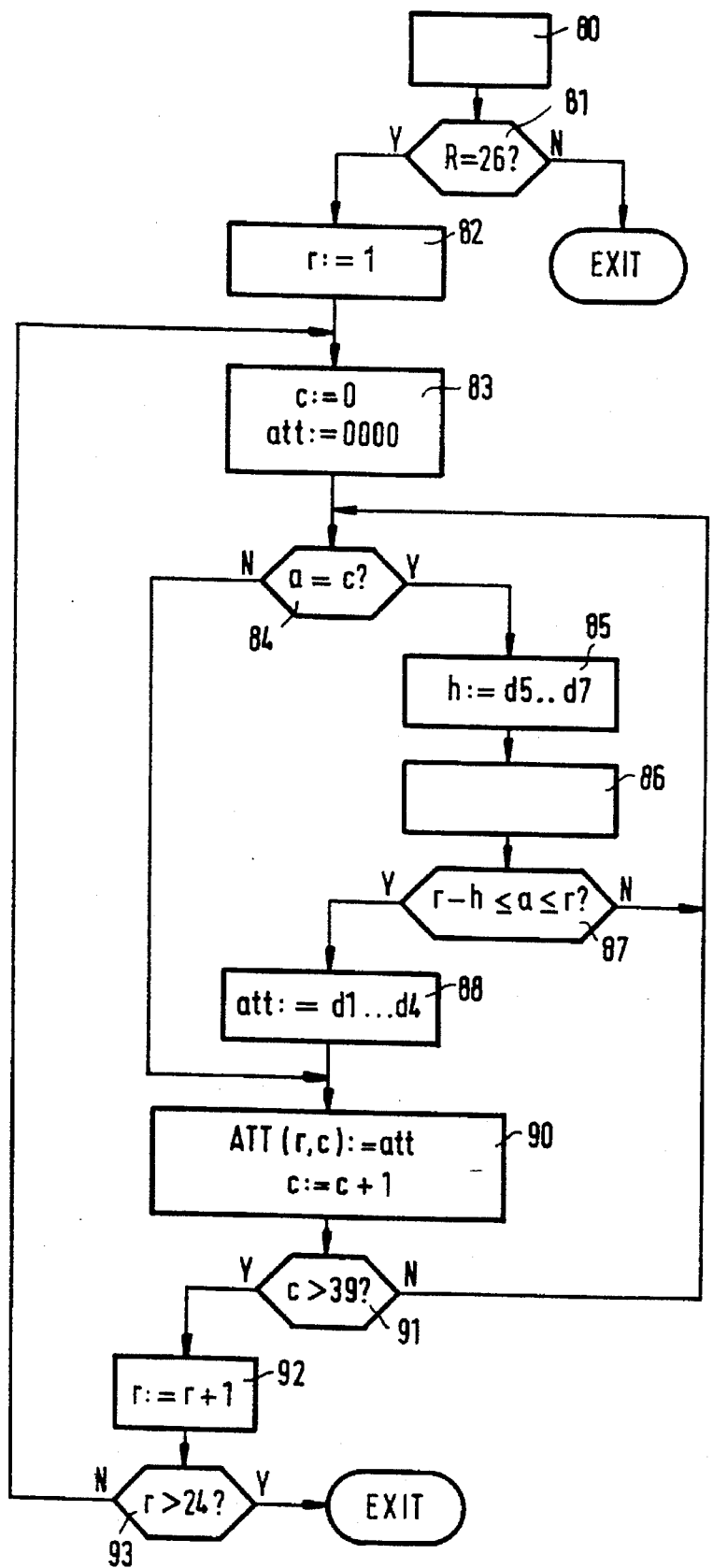
FIG. 6 shows the flow chart of a control program performed by a microprocessor shown in FIG. 5.

The operation of the teletext decoder shown in FIG. 5 is determined by a control program which is stored in the microprocessor. FIG. 6 shows the flow chart of a possible example of this control program. In a step 80, the control program waits for the reception and storage of the data packets of the desired page. In a step 81, it is ascertained whether extension packets with row number R=26 have been received. If this is not the case, then the control program is ended and the page is displayed.

If one or more extension packets are stored in the memory, the further attributes of the page are written row by row and column by column in the memory locations ATT (r,c). In a first step 82 of this process, a row counter r assumes an initial value 1. In a step 83, a column counter c assumes an initial value 0 and a 4-bit default value 0000 is assigned to a variable "att". This value means that the attributes "underline", "bold", "italics" and "proportional spacing" are inactive. In a step 84, it is subsequently checked whether a column triplet is present in extension packet 26, whose address field a is equal to the column counter c. If this is not the case, the current attribute value (currently still 0000) is written in the attribute memory in a step 90, and the column counter c is raised by 1. In a step 91, it is ascertained whether all column positions 0–39 of a row have been processed in this way. As long as this is not the case, the program will return to the step 84 so as to ascertain whether a column triplet is available for the next column position.

If it is thus ascertained for a given column position c that a column triplet is available, then the microcomputer will decode, in a step 85, the bits d5 ... d7 accommodated in the data field. As already described, these bits represent the height of an area. In the step 85, this height is temporarily stored in a variable h.

In a step 86, the microcomputer subsequently reads, in extension packet 26, the row triplet preceding the current column triplet. In a step 87, the program checks whether the address field a of this row triplet (which represents a row number in the 1–24 range after subtraction of the offset value 39) has a value r−h≦a≦r. If this requirement is not fulfilled, the row counter r instantaneously has a value r<a or r>a+h, which means that character position (r,c) is outside an area which is defined by the current column triplet. In other words, the current column triplet is not relevant to the current character position. The program will then return to the step 84 so as to ascertain whether there is another column triplet available for the current column position c. If no relevant column triplet is found in this way, a change of attribute is apparently not necessary and the program will continue with the afore-mentioned step 90 in which the current attribute is stored in memory location ATT(r,c).

If it has been found in the step 87 that the condition r−h≦a≦r is satisfied, this will mean that the current character position (r,c) is in an area which is defined by the current column triplet. In a step 88, the value d1 ... d4 from the data field of the column triplet is then assigned to the variable att. This new value is subsequently applicable (step 90) to the current and next character positions, in principle as far as the end of the row (step 91). However, if an active area is detected again further down the row (step 87), the attribute value will be applicable as far as the left border of this area.

In this way, the page is provided row by row with the further attributes transmitted by extension packet 26. After processing of a row, the row counter r is raised in a step 92, whereafter the new row initially starts with the default attributes (step 83). As soon as it is ascertained after raising the row counter in a step 93 that all rows have been processed, the control program is ended and the page will be displayed.

The transmission of teletext pages according to the invention is extremely efficient and provides the possibility of efficient processing by the receiver. It is apparent from the description of the operation of the receiver that the actual attributes can always be found in the received extension packet 26, or may have a predetermined fixed default value. It is, for example unnecessary to memorize attributes and activate them again further down the page.

What is claimed is:

1. A method of transmitting teletext pages, comprising the steps of:
   (a) transmitting a teletext page with first display attributes; and
   (b) transmitting extension signals for transmitting further attributes for display from predetermined row positions and predetermined column positions such that the extension signals comprise height codes indicating the number of further rows in which the further attributes are repeated from the predetermined column positions.

2. A method as claimed in claim 1, wherein:
   a predetermined row position and a predetermined column position and a height code determine a starting limit of an area; and
   the further attributes extend as far as the starting limit of an area having a higher column position.

3. A method as claimed in claim 1, wherein
   the extension signal includes one or more triplets of a teletext data packet having a predetermined row number; and
   each triplet comprises a mode field and a data field such that a height code is accommodated in the data field of a triplet whose mode field has a predetermined value.

4. A transmitter station for transmitting teletext pages, comprising:
   means for transmitting a teletext page with first display attributes; and
   means for transmitting extension signals for transmitting further attributes for display from predetermined row positions and predetermined column positions, such that height codes are accommodated in the extension signals, each height code indicating a number of further rows in which further attributes are repeated from a predetermined column position.

5. A transmitter station as claimed in claim 4, wherein:
   a predetermined row position and a predetermined column position and a height code determine a starting limit of an area; and
   the further attributes extend as far as the starting limit of an area having a higher column position.

6. A transmitter station as claimed in claim 4, wherein
   the extension signal includes by one or more triplets of a teletext data packet having a predetermined row number; and
   each triplet comprises a mode field and a data field such that a height code is accommodated in the data field of a triplet whose mode field has a predetermined value.

7. A teletext receiver for receiving and displaying teletext pages, comprising:

decoding means for decoding a teletext page with first display attributes and for decoding extension signals, each extension signal having further attributes for display from a predetermined row position and a predetermined column position;

display means for displaying the teletext page with said first display attributes and said further attributes, such that the decoding means are adapted to decode a height code accommodated in the extension signal and to repeat the further attributes from the predetermined column position in a number of further rows corresponding to the height code.

8. A receiver as claimed in claim 7, wherein the decoding means are adapted to determine a starting limit of an area from the predetermined row and column positions and the height code and to activate the further attributes as far as the starting limit of an area having a higher column position.

* * * * *